United States Patent
Gayasen et al.

(10) Patent No.: US 10,303,833 B1
(45) Date of Patent: May 28, 2019

(54) PARALLELIZING TIMING-BASED OPERATIONS FOR CIRCUIT DESIGNS

(71) Applicant: Xilinx, Inc., San Jose, CA (US)

(72) Inventors: Aman Gayasen, Hyderabad (IN);
Surya Pratik Saha, Hyderabad (IN);
Elliott Delaye, San Jose, CA (US);
Shangzhi Sun, San Jose, CA (US);
Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 183 days.

(21) Appl. No.: 15/429,014

(22) Filed: Feb. 9, 2017

(51) Int. Cl.
*G06F 17/50* (2006.01)

(52) U.S. Cl.
CPC ........ *G06F 17/505* (2013.01); *G06F 17/5081* (2013.01)

(58) Field of Classification Search
CPC ............. G06F 17/5031; G06F 17/5036; G06F 17/5045; G06F 17/505; G06F 2217/84
USPC .................................................. 716/108, 113
See application file for complete search history.

(56) References Cited

U.S. PATENT DOCUMENTS

| | | | | |
|---|---|---|---|---|
| 2005/0039152 A1* | 2/2005 | Kidd | ................... | G06F 17/5031 716/108 |
| 2005/0251775 A1* | 11/2005 | Wood | .................. | G06F 17/5036 716/124 |
| 2011/0131540 A1* | 6/2011 | Wu | ...................... | G06F 17/5031 716/108 |

\* cited by examiner

Primary Examiner — Paul Dinh
(74) Attorney, Agent, or Firm — Kevin T. Cuenot

(57) ABSTRACT

Parallelizing operations for implementing a circuit design can include dividing, using a processor, the circuit design into a plurality of partitions, wherein each partition is stored as a separate file, for each partition, generating, using the processor, a timing arc file specifying boundary delays for the partition, and generating, using the processor, a partition design file specifying interfaces of the partitions. Using the processor, a plurality of processes executing in parallel can be initiated. Each process is adapted to operate on a selected partition using the partition design file and the timing arc files for the other partitions to generate an updated file for the selected partition.

20 Claims, 3 Drawing Sheets

PARALLELIZING TIMING-BASED OPERATIONS FOR CIRCUIT DESIGNS

FIELD OF THE INVENTION

This disclosure relates to integrated circuits (ICs) and, more particularly, parallelizing timing-based operations for implementing circuit designs.

BACKGROUND

Modern circuit designs are typically specified programmatically using a hardware description language (HDL). In order to implement the HDL design within an integrated circuit (IC), an electronic design automation (EDA) system processes the HDL design through a design flow. The design flow typically includes multiple stages such as synthesis, which generates a netlist from the HDL design, technology mapping, placement, and routing. In some cases, the design flow may also include generation of a configuration bitstream.

When processing the circuit design through a design flow, the EDA system attempts to perform a variety of different optimization techniques on the circuit design. Often, these optimization techniques are timing-dependent. For example, whether an operation is performed and, if performed, how the operation is performed, usually depends upon current timing estimates for the circuit design and/or particular timing paths. In the usual case, the timing estimates are determined using static timing analysis techniques.

Performing the operations serially can significantly increase runtime of the EDA system. Since the timing-dependent operations tend to be global in nature, parallelizing the operations is a complex and difficult task.

SUMMARY

One or more embodiments are directed to methods of parallelizing operations for implementing a circuit design. In one aspect, a method can include dividing, using a processor, the circuit design into a plurality of partitions, wherein each partition is stored as a separate file. The method can include, for each partition, generating, using the processor, a timing arc file specifying boundary delays for the partition, generating, using the processor, a partition design file specifying interfaces of the partitions, and initiating, using the processor, a plurality of processes executing in parallel, wherein each process is adapted to operate on a selected partition using the partition design file and the timing arc files of the other partitions to generate an updated file for the selected partition.

One or more embodiments are directed to systems for parallelizing operations for implementing a circuit design. In one aspect, a system includes a processor configured to initiate executable operations. The executable operations include dividing the circuit design into a plurality of partitions, wherein each partition is stored as a separate file. The executable operations can also include, for each partition, generating a timing arc file specifying boundary delays for the partition, generating a partition design file specifying interfaces of the partitions, and initiating a plurality of processes executing in parallel, wherein each process is adapted to operate on a selected partition using the partition design file and the timing arc files of the other partitions to generate an updated file for the selected partition.

One or more embodiments are directed to computer program products for parallelizing operations for implementing a circuit design. In one aspect, a computer program product includes a computer readable storage medium having program code stored thereon. The program code is executable by a processor to perform operations including dividing, using a processor, the circuit design into a plurality of partitions, wherein each partition is stored as a separate file. The operations can also include, for each partition, generating, using the processor, a timing arc file specifying boundary delays for the partition, generating, using the processor, a partition design file specifying interfaces of the partitions, and initiating, using the processor, a plurality of processes executing in parallel, wherein each process is adapted to operate on a selected partition using the partition design file and the timing arc files of the other partitions to generate an updated file for the selected partition.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
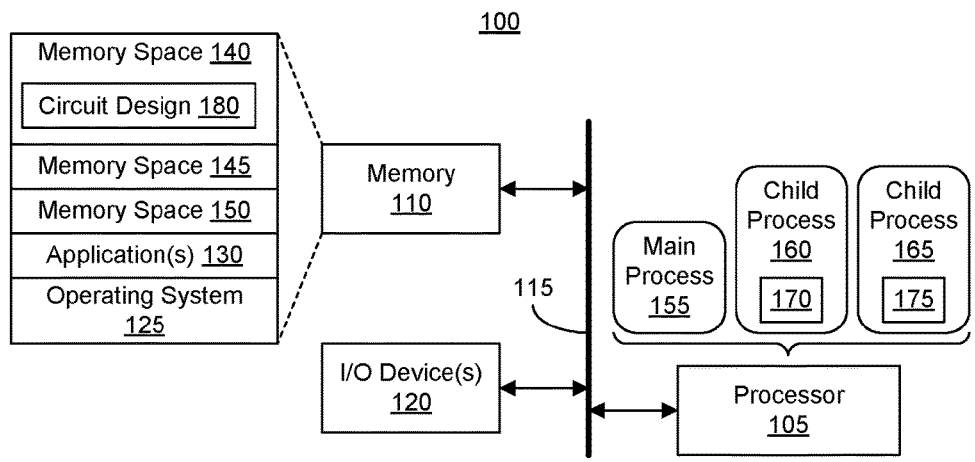
FIG. 1 illustrates an example data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, parallelizing timing-based operations for purposes of circuit design. One or more embodiments described within this disclosure are directed to parallelizing operations performed during a design flow using processes. Processes may be used instead of threads to achieve increased scaling and parallelization while reducing the complexity of administering parallelism of the system. In terms of scalability, parallel processes may be executed on a system implemented as a single data processing system or a system implemented as a plurality of interconnected data processing systems.

By performing operations in parallel, the runtime of a system adapted for performing a design flow, or portions thereof, may be reduced. As an illustrative example, conversion of a register transfer level (RTL) description of a circuit to a netlist during a synthesis stage of a design flow often involves a plurality of timing driven operations. Parallelization of these operations can significantly reduce runtime of the system. Thus, in one or more embodiments, these timing-dependent operations are scheduled using a plurality of processes executing in parallel.

The system is capable of dividing the circuit design into a plurality of partitions. The system is further capable of generating data and writing the data to a non-volatile storage device such as a disk to support parallel execution of the processes. For example, the data may include timing-characterized models for partitions of the circuit design. The models are accessible by the processes. As the processes operate on different partitions, the system is capable of using the models to ensure that timing constraints are available to the processes and to facilitate accuracy in implementing the performance optimizations for the circuit design across the processes.

As such, the system may operate on different partitions of the circuit design in parallel, where different processes operate on different ones of the partitions. The system is capable of operating on the partitions in parallel without any explicit timing budgeting. As the processes complete execution, data generated by the processes may be reassembled and written back to the non-volatile storage device. The data may be written back to the non-volatile storage device by the processes and combined into an updated, e.g., an optimized, version of the circuit design.

One or more embodiments are directed to a method of parallelizing timing driven operations for implementing a circuit design as performed by a data processing system. One or more embodiments are directed to a system adapted to parallelize timing driven operations for implementing a circuit design. One or more embodiments are directed to a computer program product adapted for parallelizing timing drive operations for implementing a circuit design.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example data processing system (system) 100. System 100 is configured to operate on a circuit design 180 using a plurality of concurrently executed processes. As pictured, system 100 includes at least one processor 105. Processor 105 may include one or more cores. Processor 105 is coupled to a memory 110 through interface circuitry 115. Examples of interface circuitry 115 include but are not limited to, an input/output (I/O) subsystem, an I/O interface, a bus system, a memory interface, or other suitable circuitry. System 100 stores computer readable instructions (also referred to as "program code") within memory 110. Memory 110 may be considered an example of computer readable storage media. Processor 105 executes the program code accessed from memory 110 via interface circuitry 115.

Memory 110 can include one or more physical memory devices such as, for example, a local memory and one or more bulk storage devices. Local memory refers to random access memory (RAM) or other non-persistent memory device(s) generally used during actual execution of the program code. A bulk storage device may be implemented as a non-volatile memory such as a hard disk drive (HDD), a solid state drive (SSD), or another persistent data storage device. System 100 may also include one or more cache memories (not shown) that provide temporary storage of at least some program code in order to reduce the number of times program code must be retrieved from the bulk storage device during execution.

System 100 may be coupled to one or more I/O devices 120. Examples of I/O devices 120 can include, but are not limited to, a keyboard, a display device, a pointing device, one or more network adapters, and so forth. A network adapter enables system 100 to become coupled to other systems, computer systems, remote printers, and/or remote storage devices. Examples of network adapters may include, but are not limited to, modems, Ethernet cards, bus adapters, wireless transceivers and/or radios, and so forth. System 100 may include one or more additional I/O device(s) beyond the examples provided. The I/O devices described herein may be coupled to system 100 either directly or through intervening I/O controllers.

As pictured, memory 110 may store an operating system 125, one or more application(s) 130, and data. Application 130, for example, may be an electronic design automation (EDA) application. In one aspect, operating system 125 and application 130, being implemented in the form of executable program code, are executed by system 100 and, more particularly, by processor 105, to perform the various operations described within this disclosure. As such, operating system 125 and application 130 may be considered an integrated part of system 100.

Operating system 125, application 130, and any data used, generated, and/or operated upon by system 100 are functional data structures that impart functionality when employed as part of system 100 or when provided to an IC for implementation therein. A "data structure" refers to a physical implementation of a data model's organization of information within a physical memory. As such, a data structure is formed of specific electrical or magnetic structural elements in a memory. A data structure imposes physical organization on information, e.g., data and/or program code, stored in the memory as used by a processor.

System 100 may include fewer components than shown or additional components not illustrated in FIG. 1 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

In the example of FIG. 1, memory 110 includes a plurality of memory spaces 140, 145, and 150. Processor 105 is capable of executing a plurality of processes 155, 160, and 165. Process 155 is a main process with processes 160 and 165 each being a child process thereof. Memory space 140 is a dedicated memory space for main process 155. Memory space 145 is a dedicated memory space for child process 160. Memory space 150 is a dedicated memory space for child process 165. Each of memory spaces 140, 145, and 150 is separate and independent to maintain independence among processes 155, 160, and 165.

Main process 155, as executed by processor 105, is adapted to partition circuit design 180 into a plurality of partitions. In the example of FIG. 1, processor 105 partitions circuit design 180 into partitions 170 and 175. Further, processor 105 executes processes 155, 160, and 165 concurrently. In an embodiment, where processor 105 has a plurality of cores, each process may be executed by a different core or two processes may be executed concurrently by one core while another core executes a third process concurrently with the first and second processes. In any case, process 160 performs one or more timing-dependent operations on partition 170 and writes an updated version of partition 170 to memory 110. Similarly, process 165 performs one or more timing-dependent operations on partition 175 and writes an updated version of partition 175 to memory 110.

Upon completion of each of processes 160 and 165, main process 155 is capable of combining the updated versions of partitions 170 and 175 into a unified circuit design (not shown). The resulting circuit design generated by merging results of processes 160 and 165 is functionally equivalent to circuit design 180, albeit modified, e.g., optimized, in one or more respects. For example, the resulting circuit design may have improved timing, utilize fewer resources (circuit components) of a target integrated circuit, etc.

It should be appreciated that the number of cores, processes, and partitions shown in FIG. 1 is for purposes of illustration only. The inventive arrangements described within this disclosure are not intended to be limited by the examples provided. For example, one or more embodiments may include more processes than shown. One or more embodiments may include fewer processes than shown, e.g., a main process and a single child process where the main process performs operations described herein in addition to operations performed in parallel with the single child process.

In accordance with the inventive arrangements described within this disclosure, processes are used to implement the parallelization. Unlike threads, each process utilizes its own memory space that is maintained independently of the memory spaces of the other processes executing in parallel. The memory space of each process, for example, may include executable program code and data that may include one or more files. Each process further is capable of reading data from and/or writing data to disk or other bulk storage device. Usage of processes as opposed to threads alleviates much of the administrative overhead associated with attempting to operate on a circuit design in parallel utilizing threads. In the case of threads, for example, a significant amount of time and effort is required to synchronize data among the threads to maintain an accurate global view of timing for the circuit design as each of the threads operates. This overhead is not incurred with processes. Usage of processes also facilitates scaling of the various embodiments described herein to operate across multiple different machines, which is not possible in the case of threads that share a same memory space. Thus, the inventive arrangements may be scaled to a significant degree to operate on systems that include many different data processing systems.

Figure 2:
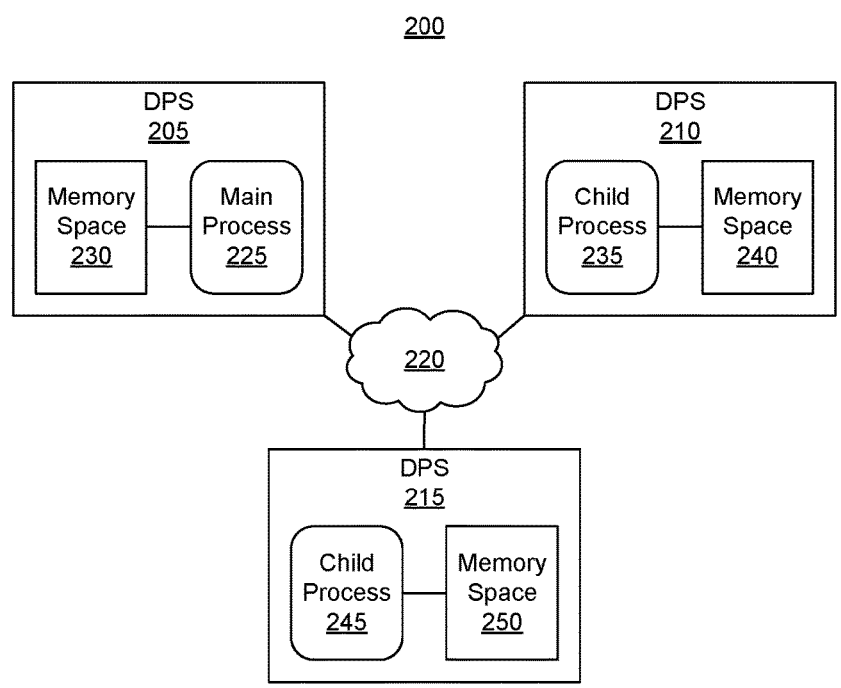
FIG. 2 illustrates an example of a computer cluster.

FIG. 2 illustrates an example of a computer cluster (cluster) 200. FIG. 2 illustrates the scalability of one or more embodiments described herein from a single data processing system and/or single processor to a system that includes multiple systems and/or processors referred to as a "cluster." As shown, cluster 200 includes a plurality of data processing systems, e.g., computers, 205, 210, and 215 which are shown using the abbreviation "DPS."

Cluster 200 is formed of a set of loosely or tightly connected systems that operate together in various respects so as to be viewed as a single, larger system. In the example of FIG. 2, systems 205, 210, and 215 are interconnected through a network 220. System 205 is configured to execute main process 225 and maintain memory space 230 independently of the other memory spaces. System 210 is configured to execute child process 235 and maintain memory space 230 independently of the other memory spaces. System 215 is configured to execute child process 245 and maintain memory space 250 independently of the other memory spaces.

Each of child processes 235 and 245 may operate on a partition of a circuit design concurrently as generally described with reference to FIG. 1. FIG. 2 is provided for purposes of illustration to show scalability. In this regard, the number of processes, partitions, etc., included in FIG. 2 are provided for purposes of illustration and not limitation. The size of cluster 200 in terms of number of systems may be scaled significantly larger than the example shown.

Figure 3:
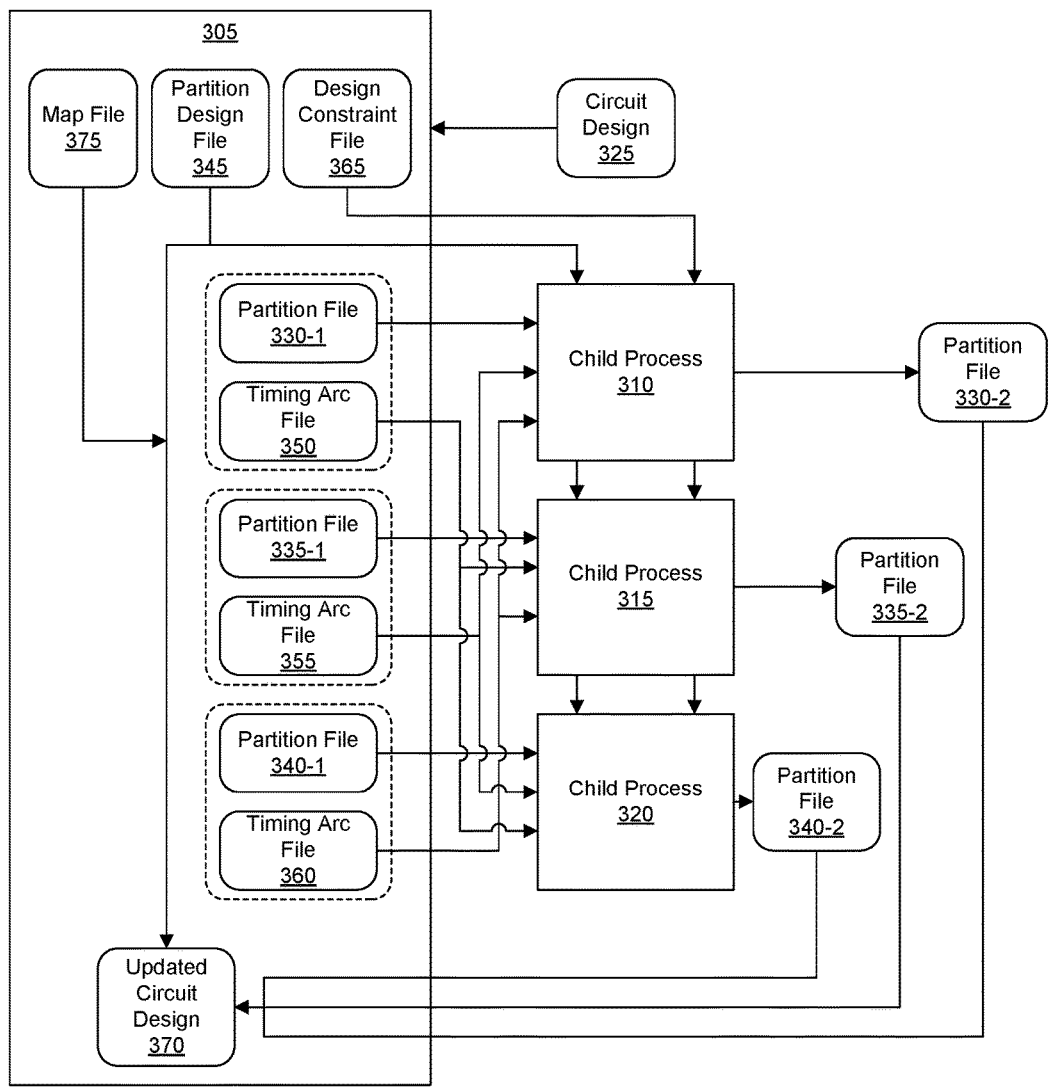
FIG. 3 illustrates an example of parallelizing operations for implementing a circuit design.

FIG. 3 illustrates an example of parallelizing operations for implementing a circuit design. The example of FIG. 3 includes a main process 305 and a plurality of child processes 310, 315, and 320 that execute under control of main process 305. In an embodiment, each of processes 305-320 executes in a same processor. In one aspect, processes 305-320 execute in a single core. In another aspect, processes 305-320 execute in different cores of the processor. In another embodiment, each of processes 305-320 executes in a different processor and/or system.

Main process 305 is capable of dividing a circuit design 325 into a plurality of partitions. Each partition is stored as a separate file shown as partition files 330-1, 335-1, and 340-1. In an embodiment, circuit design 325 is a netlist. For example, each partition is a portion of the netlist that is stored in one of partition files 330-1, 335-1, and 340-1. For purposes of illustration, the partitions specified within partition files 330-1, 335-1, and 340-1 may be referred to as "partition 330-1," "partition 335-1," and "partition 340-1."

Main process 305 is capable of generating data that may be accessed and used by processes 310-320. Main process 305 generates a partition design file 345 and a plurality of timing arc files 350, 355, and 360. In one embodiment, partition design file 345 specifies each of the partitions 330-1, 335-1, and 340-1. Partition design file 345 does not specify the internal portions of the partitions. Instead, partition design file 345 specifies each of partitions 330-1, 335-1, and 340-1 as a "black box" or a "shell" that is devoid of internal structure. Thus, a "shell" or "partition shell" is effectively an empty placeholder for the partition. In another embodiment, partition design file 345 does specify an interface for each partition as part of each shell. In some respects, partition design file 345 is referred to as a "skeleton file" in that partition design file 345 does not specify the content of any partition other than the interface of the partition and provides a framework or hierarchy of the partitions of circuit design 325.

Timing arc files 350, 355, and 360 specify timing arcs for the partitions 330-1, 335-1, and 340-1, respectively. For example, timing arc file 350 specifies timing arcs for partition 330-1. Timing arc file 355 specifies timing arcs for partition 335-1. Timing arc file 360 specifies timing arcs for partition 340-1. In the example of FIG. 3, each process is adapted to operate on at least one partition file. For example, child process 310 operates on partition file 330-1 and, in doing so, reads partition design file 345. Since partition file 330-1 includes timing information for partition 330-1 only, child process 310 reads timing arc files for the other partitions, e.g., timing arc file 355 for partition 335-1 and timing arc file 360 for partition 340-1. Child process 310 also reads design constraint file 365 to read the timing constraints applicable to partition file 330-1.

Child process 310, in reading timing arc files 355 and 360, reads the timing information for those partitions not being operated upon by child process 310. By reading partition file 330-1 and timing arc files 355 and 360, child process 310 has an accurate representation of the timing for the entire circuit design 325 and is able to operate on a portion of circuit design 325 without loading the entirety of circuit design 325 into memory (e.g., execution memory or RAM).

Child process 315 operates on partition file 335-1 and, in doing so, reads partition design file 345 and timing arc files 350 and 360. Process 315 also reads design constraint file 365 to read the timing constraints applicable to partition file 335-1. Child process 320 operates on partition file 340-1 and, in doing so, reads partition design file 345 and timing arc files 350 and 355. Process 320 also reads design constraint file 365 to read the timing constraints applicable to partition file 340-1.

Process 310, in operating on partition file 330-1, generates an updated version of the partition as partition file 330-2. Process 315, in operating on partition file 335-1, generates an updated version of the partition as partition file 335-2. Process 320, in operating on partition file 340-1, generates an updated version of the partition as partition file 340-2. Each of processes 310, 315, and 320 is capable of executing in parallel, e.g., concurrently. Parallel operation of processes 310-320 can significantly reduce runtime of the system.

Each of processes 310-320 is capable of storing the updated partition file generated by that process. Processes 310-320 store the updated partition files 330-2, 335-2, and 340-2, respectively, to a bulk data storage so as to be readable by other processes. Main process 305 is capable of reading partition files 330-2, 335-2, and 340-2 from the bulk storage device. In an embodiment, main process 305 is capable of updating partition design file 345 to generate updated circuit design 370. For example, main process 305 transfers the contents of each partition file 330-2, 335-2, and 340-2 into the corresponding shell for that partition in partition design file 345.

For purposes of illustration, main process 305 updates the empty partition (e.g., shell) of partition design file 345 corresponding to the partition stored in partition file 330-1 with the contents of partition file 330-2. Similarly, main process 305 updates the empty partition of partition design file 345 corresponding to the partition stored in partition file 335-1 with the contents of partition file 335-2. Main process 305 further is capable of updating the empty partition of partition design file 345 corresponding to the partition stored in partition file 340-1 with the contents of partition file 340-2. The result of updating partition design file 345 is updated circuit design 370, which includes each of the updated partitions as a unified circuit design.

In one or more embodiments, main process 305 is capable of generating a map file 375. Map file 375 includes records indicating which partition, and as such, partition file, maps to which partition shell of partition design file 345. Map file 375 may specify a one-to-one mapping that main process 305 uses to create updated circuit design 370, which includes the content of partition files 330-2, 335-2, and 340-2.

Figure 4:
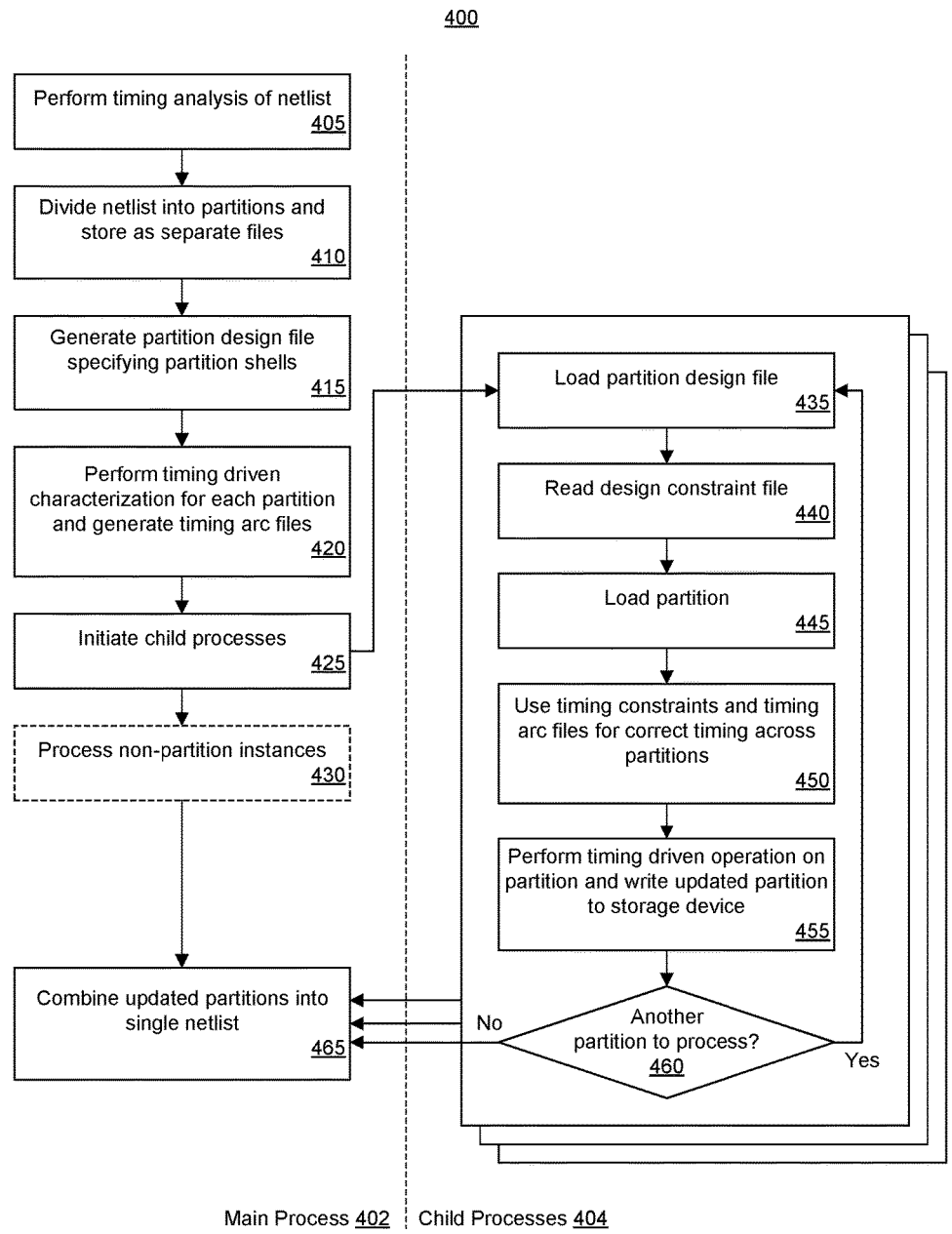
FIG. 4 illustrates a method of parallelizing operations for implementing a circuit design.

FIG. 4 illustrates a method 400 of parallelizing operations for implementing a circuit design. Method 400 is generally described as being performed by a main process 402 and one or more child processes 404. As discussed, the processes may be executed by a single system including a single processor that may have a single core or multiple cores. The processes may be executed by a plurality of data processing systems organized as a cluster. In the example of FIG. 4, for purposes of discussion, the circuit design is specified as a netlist. Further, method 400 may be performed as part of a synthesis stage of a design flow for the circuit design.

In block 405, the main process performs timing analysis of the netlist. For example, the main process is capable of performing static timing analysis of the netlist. In block 410, the main process divides the netlist into a plurality of partitions. Each partition is written or stored to a data storage device, e.g., a non-volatile storage device such as a disk, as a separate file. In an embodiment, the main process is capable of dividing the netlist into partitions based upon size and/or timing. Thus, the netlist of the circuit design is separated and stored as a plurality of netlists referred to as partitions.

In an embodiment, the main process is capable of detecting a module of the netlist that is large enough to be a partition by itself. An example of a module that may be considered large enough to be a partition by itself may be one with more than a threshold number of gates. The threshold may be, for example, 10,000. It should be appreciated that the threshold may be changed or set as a system preference and the value provided is for purposes of illustration and not limitation.

In cases where a module is very large and includes sub-hierarchies inside, for example, the main process is capable of creating multiple partitions from the module with each partition including a sub-hierarchy of the module. In other cases, for example, the main process detects a module that is large and includes no sub-hierarchies inside. In such cases, the main process is capable of dividing the module into a plurality of partitions according to size.

In an embodiment, the main process is capable of partitioning based upon timing information. The main process may use the timing information generated from the timing analysis performed in block 405. In the case where the main process detects a critical timing path that spans two or more partitions, for example, the main process is capable of combining the partitions spanned by the critical timing path so that the critical timing path remains in a single partition. The condition of keeping a critical timing path in a single partition, however, is not guaranteed for a variety of reasons. One reason is that criticality of timing paths is estimated based upon the timing information available at the current stage of the design flow which may not be entirely accurate or detailed. Another reason is that the timing of the circuit design and timing paths therein will continue to change and evolve as the design flow progresses. Thus, timing paths initially considered to be critical may not be critical in other stages of the design flow.

In block 415, the main process generates a partition design file specifying the partition shells, e.g., empty partitions. In an embodiment, the main process is capable of creating a file and storing a name or placeholder for each partition and the interface for each partition within the partition design file. In another embodiment, the main process is capable of generating the design file by replacing the portion of the netlist corresponding to each partition with a shell for the partition. In block 415, the main process may also generate the map file.

The main process is capable of writing, for each partition, the pins of the partition that exist on the boundary of the partition as the interface. Thus, the interface of each partition is the set of pins existing on the boundary of that partition. Internal pins of the partitions, for example, are not included in the partition shells as such structure is instead specified in the individual partition files that are generated and provided to the child processes. The partition design file preserves the hierarchy of the circuit design. That is, the hierarchy that exists in the netlist prior to partitioning is not changed by dividing the netlist into partitions or creating the partition shells.

In order to support parallel processing as described herein, the main process may need to vary the handling of design constraints within the design constraints file. In one example, where a design constraint applies to a top module port, no changes are needed. An example of a design constraint for a top module port is "create_clock [get_ports clk]." The parallel child processes have access to the top module port because each child process loads partition design file which specifies the top module ports as the interface(s) for each partition.

In another example, a design constraint may apply to a hierarchical path. An example of a design constraint specifying a hierarchical path is "create_generated_clock [get_pins A/B/p]," which applies to pin "p" with a hierarchical path "A/B/p." Consider the case where the pin "p" is located within a partition "X" that is not loaded into memory for processing (e.g., is not operated on by a child process). The design constraint applies to a signal that may affect a partition "Y," which is currently being operated on by a child process. For purposes of illustration, the constraint may apply to a clock signal generated inside of partition "X" with the clock signal feeding through to partition "Y." The child process requires access to the timing constraint and the pin to properly process partition "Y." In that case, the main process is capable of modeling the "A/B/p" pin as an internal pin on the partition boundary of partition "X." As such, the "A/B/p" pin is added to the partition design file as part of the interface of partition "X." Within the design constraint file, the timing constraint is then associated with the "A/B/p" pin on the partition boundary within the partition design file. Because the partition design file is loaded by each of the child processes, each child process has the information necessary to handle the timing constraint.

In cases where a design constraint applies to a cell or a cell instance, the main process is capable of translating the cell into pins. A design constraint referring to a cell may not be modelled as an internal pin on the partition interface because the intention of the design constraint is to apply to the cell. During operation of the EDA system (e.g., the main process), however, cell objects are expanded or represented as a set of pins. Accordingly, the main process is capable of creating a file and storing the pins of the cell to which the design constraint applies into the file stored on a data storage device (e.g., a disk). The child processes may then read the pins from the file. The child processes apply the design constraints therein. Examples of design constraints that are applicable to cells include, but are not limited to, "set_false_path [get_cells A/B/c]," and "current_instance [get_cells A/B]."

In block 420, the main process performs a timing driven characterization for each partition and generates timing arc files for the partitions. The main process is capable of writing a timing arc file for each partition. The main process is capable of writing timing information for each partition into a timing arc file for each respective partition. Each of the timing arc files includes the timing arcs for the partition as determined from the static timing analysis of block 405.

A timing arc is a data structure that specifies a timing dependence between signals at any two related pins of a circuit design or netlist. Timing arcs are usually used to perform static timing analysis and may be used for performing gate level synthesis of the circuit design. A timing arc defines the propagation of signals through logic gates/nets. A timing arc is one of the components of a timing path. Static timing analysis works on the concept of timing paths. Each timing path starts from either a primary input or a register and ends at a primary output or a register. In-between, the timing path traverses through "timing arcs." For instance, AND, NAND, NOT, full adder cell etc. gates have timing arcs from each input pin to each output pin. Sequential cells such as flip-flops and latches have timing arcs from clock pin to output pins and data pins. Net connections can also be identified as timing arcs.

Thus, each timing arc file specifies boundary delays for a partition. The timing arc files do not store timing arcs from inside the partitions. Rather, each timing arc file stores timing arcs for the input(s) and the output(s) of the relevant partition. As an illustrative example, the timing arc file for a partition may store a timing arc specifying a delay for a portion of a timing path starting at a flip-flop at the output of the partition and continuing to an output pin of the partition. Similarly, the timing arc file for the partition may store another timing arc specifying a delay for a portion of a timing path starting at an input pin of the partition and continuing to a first flip-flop in the partition.

In block 425, the main process initiates the child processes. Blocks 435-460 represent operations performed by a child process. It should be appreciated that the child processes execute in parallel, or concurrently, to process the partitions of the netlist. The child processes may operate under control of the main process. For example, the main process may assign partitions of the circuit design to the processes.

In block 435, each of the child processes loads the partition design file. Each child process executing in parallel loads a copy of the partition design file. The partition design file, as noted, may be stored on disk so as to be available to each of the child processes for loading into the memory space of each partition. In block 440, each child process reads the design constraint file to load the timing constraints for the particular partition upon which the child process operates. The design constraints file may also be stored on disk so as to be accessible by each child process. Accordingly, each child process has the timing information needed for the partition upon which the child process is operating. Each child process therefore has the boundary timing conditions and timing constraints needed since the boundary delays influence timing of the partition operated on by that child process. Because each child process is able to read the design constraints file and has the timing arc file for the partition being operated upon, each child process is able to determine correct timing for the partition.

In block 445, each child process loads the particular partition upon which the child process is to operate. Thus, each child process loads only a portion of the circuit design into the memory space of the child process. The portion loaded is the particular partition of the circuit design being operated on by that child process.

In block 450, each child process is capable of using the timing constraints for the partition and the timing arc files, e.g., reading the timing arc files, for other partitions not operated upon by the child process as illustrated in FIG. 3 to determine correct timing for the partition using the boundary delays. Each of the child processes is capable of performing static timing analysis on the partition being operated upon as may be required for performing one or more timing-driven optimization operations for the partition. Each child process is capable of determining accurate and "in context" timing for the partition operated upon by the child process using the design constraints file, the timing arcs files, and the partition design file. A child process is able to determine boundary timing information for the partition being operated upon by the child process as well as for other partitions that may influence the partition being operated upon.

In effect, each child process operating on a partition is capable of performing timing analysis for that partition. In other words, each child process is able to perform static timing analysis for a partition of the circuit design without having to load the entire circuit design. Further, the design constraints, including timing constraints, may be applied without having to load the entire design. Rather, each child process is capable of performing timing analysis and/or applying design constraints using the partition design file, the design constraints file, and the partition.

In block 455, the child process performs one or more timing driven operations on the partition and writes the updated partition to the storage device, e.g., to disk. Example timing driven operations can include, but are not limited to, mapping the design to lookup-tables (LUTs), LUT combining, retiming (e.g., by moving flip-flops), etc. The list of timing drive operations is provided for purposes of illustration and is not intended to be limiting of the particular timing driven operations that may be performed.

In block 460, the child process determines whether any further partitions remain to be processed. If so, method 400 loops back to block 440 where the child process begins operating on another partition. If not, method 400 continues to block 465. It should be appreciated that the number of child processes may vary. There may be a number of child processes that is equal to the number of partitions. In other cases, there may be more partitions than child processes. When there are more partitions than child processes, though the child processes execute concurrently, a given child process may operate two or more partitions sequentially.

Referring to block 430, the main process is capable of processing any non-partition instance of the netlist. In some cases, the netlist may include small portions of the netlist that the main process chooses not to include in a partition. For example, while parallelization can significantly reduce runtime, overhead still exists in terms of reading and writing data to disk. As such, in some cases, where the portion of the netlist is sufficiently small in size, e.g., less than a threshold number of gates, the main process may perform one or more timing-dependent operations on that portion in a serial manner. Appreciably, the threshold may vary based upon the design and may be a system setting. Example thresholds include, but are not limited to, 5,000 gates, 10,000 gates, etc. In other cases, the main process may exclude particular cells such as input/output (I/O) cells from the partition process. In an embodiment, the main process is capable of creating a temporary partition for instances that are not in any other partition and operate on the temporary partition. Accordingly, such cells may be handled by the main process in block 435.

In block 465, the main process reads the updated partitions generated by the child processes and combines the updated partition files to generate a single, unified netlist. In an embodiment, the main process is capable of copying the updated netlist portion from each updated partition back into the corresponding shell within the partition design file. The updated partition design file is written to disk.

In accordance with the inventive arrangements described herein, processes are used to implement parallelization. The use of processes in lieu of threads means that synchronization of data among the processes is not a concern since processes do not share memory space. As each process has a dedicated memory space, data conflicts from synchronization are eliminated. Each process may operate independently on an individual netlist, e.g., the partition file.

While the use of processes for parallelizing operations is described herein largely in the context of synthesis, the inventive arrangements may be applied to other stages of a design flow for a circuit design. In one example, parallelization using processes may be applied to placement. In that case, the main process can partition the circuit design into a plurality of independent partitions that each of the child processes may operate upon performing placement in parallel.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "hardware description language" is a computer-language that facilitates the documentation, design, and manufacturing of a digital system, such as an integrated circuit. A hardware description language, or HDL, combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high level programming languages, an HDL also includes an explicit notion of time, which is a primary attribute of a digital system.

The term "netlist" refers to a data structure that describes connectivity of an electronic circuit. A netlist is effectively a collection of several related lists. In some cases, a netlist is a list of the terminals ("pins") of the electronic components in a circuit and a list of the electrical conductors that interconnect the terminals. The electronic components may be gates, for example. A net is a conductor that interconnects two or more component terminals.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

In some instances, the term "signal" may be used within this disclosure to describe physical structures such as terminals, pins, signal lines, wires. In other instances, the term "signal" may be used to refer to particular values specified by a wire. The term "signal" may refer to the conveyance of a single bit, e.g., a single wire, or the conveyance of multiple parallel bits through multiple parallel wires. Further, each signal may represent bi-directional communication between two, or more, components connected by the signal.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods of parallelizing operations for implementing a circuit design. In one aspect, a method can include dividing, using a processor, the circuit design into a plurality of partitions, wherein each partition is stored as a separate file. The method can include, for each partition, generating, using the processor, a timing arc file specifying boundary delays for the partition, generating, using the processor, a partition design file specifying interfaces of the partitions, and initiating, using the processor, a plurality of processes executing in parallel, wherein each process is adapted to operate on a selected partition using the partition design file and the timing arc files of the other partitions to generate an updated file for the selected partition.

In one aspect, the method can include combining results from the plurality of processes into an updated circuit design.

In another aspect, combining the results can include writing contents of the updated file for each partition to a corresponding shell of the partition design file.

In another aspect, the partition design file specifies shells for partitions. In another aspect, the interfaces include partition boundary pins.

In another aspect, the timing arc file for each partition specifies input timing arcs and output timing arcs of the partition.

In another aspect, each process, upon execution, can read the partition design file, design constraints for the partition, and the partition being processed. For example, each process loads a portion of the circuit design rather than loading the entirety of the circuit design in order to operate on the partition.

In another aspect, each process stores an updated file for the partition operated on by the process to a bulk storage device.

In another aspect, each process is adapted to perform static timing analysis on the partition operated on by the process using the timing arc files of the other partitions.

One or more embodiments are directed to systems for parallelizing operations for implementing a circuit design. In one aspect, a system includes a processor configured to initiate executable operations. The executable operations include dividing the circuit design into a plurality of partitions, wherein each partition is stored as a separate file. The executable operations can also include, for each partition, generating a timing arc file specifying boundary delays for the partition, generating a partition design file specifying interfaces of the partitions, and initiating a plurality of processes executing in parallel, wherein each process is adapted to operate on a selected partition using the partition design file and the timing arc files of the other partitions to generate an updated file for the selected partition.

In one aspect, the processor is configured to initiate executable operations including combining results from the plurality of processes into an updated circuit design.

In another aspect, combining the results can include writing contents of the updated file for each partition to a corresponding shell of the partition design file.

In another aspect, the partition design file specifies shells for partitions. In another aspect, the interfaces include partition boundary pins.

In another aspect, the timing arc file for each partition specifies input timing arcs and output timing arcs of the partition.

In another aspect, each process, upon execution, can read the partition design file, design constraints for the partition, and the partition being processed. For example, each process loads a portion of the circuit design rather than loading the entirety of the circuit design in order to operate on the partition.

In another aspect, each process stores an updated file for the partition operated on by the process to a bulk storage device.

In another aspect, each process is adapted to perform static timing analysis on the partition operated on by the process using the timing arc files of the other partitions.

One or more embodiments are directed to computer program products for parallelizing operations for implementing a circuit design. In one aspect, a computer program product includes a computer readable storage medium having program code stored thereon. The program code is executable by a processor to perform operations including dividing, using a processor, the circuit design into a plurality of partitions, wherein each partition is stored as a separate file. The operations can also include, for each partition, generating, using the processor, a timing arc file specifying boundary delays for the partition, generating, using the processor, a partition design file specifying interfaces of the partitions, and initiating, using the processor, a plurality of processes executing in parallel, wherein each process is adapted to operate on a selected partition using the partition design file and the timing arc files of the other partitions to generate an updated file for the selected partition.

In one aspect, the operations can include combining results from the plurality of processes into an updated circuit design.

In another aspect, combining the results can include writing contents of the updated file for each partition to a corresponding shell of the partition design file.

In another aspect, the partition design file specifies shells for partitions. In another aspect, the interfaces include partition boundary pins.

In another aspect, the timing arc file for each partition specifies input timing arcs and output timing arcs of the partition.

In another aspect, each process, upon execution, can read the partition design file, design constraints for the partition, and the partition being processed. For example, each process loads a portion of the circuit design rather than loading the entirety of the circuit design in order to operate on the partition.

In another aspect, each process stores an updated file for the partition operated on by the process to a bulk storage device.

In another aspect, each process is adapted to perform static timing analysis on the partition operated on by the process using the timing arc files of the other partitions.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of parallelizing operations for implementing a circuit design, the method comprising:
dividing, using a processor, the circuit design into a plurality of partitions, wherein each partition is stored as a separate file;
for each partition, generating, using the processor, a timing arc file specifying boundary delays for the partition, wherein each timing arc file specifies timing arcs for inputs and outputs of the corresponding partition and no timing arcs from inside the corresponding partition;
generating, using the processor, a partition design file specifying interfaces of the partitions; and
initiating, using the processor, a plurality of processes executing in parallel, wherein each process is adapted to operate on a selected partition using the partition design file and the timing arc files, excluding the timing arc file of the selected partition, to generate an updated file for the selected partition;
wherein each of the plurality of processes performs synthesis or placement of a design flow, and the updated files, forming an updated circuit design, are implemented in an integrated circuit.

2. The method of claim 1, further comprising:
combining results from the plurality of processes into the updated circuit design.

3. The method of claim 2, wherein combining the results includes writing contents of the updated file for each partition to a corresponding shell of the partition design file.

4. The method of claim 1, wherein the partition design file specifies shells for partitions and the interfaces include partition boundary pins.

5. The method of claim 1, wherein the plurality of processes are child processes managed by a main process and the main process performs a timing dependent operation on a portion of the circuit design not included in any of the plurality of partitions.

6. The method of claim 1, wherein each process, upon execution, reads the partition design file, design constraints for the partition, and the partition being processed.

7. The method of claim 1, wherein each process stores an updated file for the partition operated on by the process to a bulk storage device.

8. The method of claim 1, wherein each process is adapted to perform static timing analysis on the partition operated on by the process using the timing arc files of the other partitions.

9. A system for parallelizing operations for implementing a circuit design, comprising:
a processor configured to initiate executable operations including:
dividing the circuit design into a plurality of partitions, wherein each partition is stored as a separate file;
for each partition, generating a timing arc file specifying boundary delays for the partition, wherein each timing arc file specifies timing arcs for inputs and outputs of the corresponding partition and no timing arcs from inside the corresponding partition;
generating a partition design file specifying interfaces of the partitions; and
initiating a plurality of processes executing in parallel, wherein each process is adapted to operate on a selected partition using the partition design file and the timing arc files, excluding the timing arc file of the selected partition, to generate an updated file for the selected partition;
wherein each of the plurality of processes performs synthesis or placement of a design flow, and the updated files, forming an updated circuit design, are implemented in an integrated circuit.

10. The system of claim 9, wherein the processor is configured to initiate executable operations further comprising:
combining results from the plurality of processes into the updated circuit design.

11. The system of claim 10, wherein combining the results includes writing contents of the updated file for each partition to a corresponding shell of the partition design file.

12. The system of claim 9, wherein the partition design file specifies shells for partitions and the interfaces include partition boundary pins.

13. The system of claim 9, wherein the plurality of processes are child processes managed by a main process and the main process performs a timing dependent operation on a portion of the circuit design not included in any of the plurality of partitions.

14. The system of claim 9, wherein each process, upon execution, reads the partition design file, design constraints for the partition, and the partition being processed.

15. The system of claim 9, wherein each process stores an updated file for the partition operated on by the process to a bulk storage device.

16. The system of claim 9, wherein each process is adapted to perform static timing analysis on the partition operated on by the process using the timing arc files of the other partitions.

17. A computer program product comprising a computer readable storage medium having program code stored thereon for parallelizing operations for implementing a circuit design, the program code executable by a processor to perform operations comprising:
dividing, using the processor, the circuit design into a plurality of partitions, wherein each partition is stored as a separate file;
for each partition, generating, using the processor, a timing arc file specifying boundary delays for the partition, wherein each timing arc file specifies timing arcs for inputs and outputs of the corresponding partition and no timing arcs from inside the corresponding partition;
generating, using the processor, a partition design file specifying interfaces of the partitions; and
initiating, using the processor, a plurality of processes executing in parallel, wherein each process is adapted to operate on a selected partition using the partition design file and the timing arc files, excluding the timing arc file of the selected partition, to generate an updated file for the selected partition;
wherein each of the plurality of processes performs synthesis or placement of a design flow, and the updated files, forming an updated circuit design, are implemented in an integrated circuit.

18. The computer program product of claim 17, wherein the program code is executable by the processor to perform operations further comprising:
combining results from the plurality of processes into the updated circuit design.

19. The computer program product of claim 18, wherein combining the results includes writing contents of the updated file for each partition to a corresponding shell of the partition design file.

20. The computer program product of claim 17, wherein:
the partition design file specifies shells for partitions and the interfaces include partition boundary pins; and
the timing arc file for each partition specifies input timing arcs and output timing arcs of the partition.

* * * * *